United States Patent
Petri et al.

(10) Patent No.: US 9,609,891 B2
(45) Date of Patent: Apr. 4, 2017

(54) TUMBLE DRUM FOR FLAVORING FOOD PORTIONS

(71) Applicant: Paul A. Svejkovsky, Rockwall, TX (US)

(72) Inventors: Kenneth C. Petri, Richardson, TX (US); P. Blake Svejkovsky, Coppell, TX (US); Paul A. Svejkovsky, Rockwell, TX (US)

(73) Assignee: Kenneth C. Petri, Richardson, TX (US)

( * ) Notice: Subject to any disclaimer, the term of this patent is extended or adjusted under 35 U.S.C. 154(b) by 74 days.

(21) Appl. No.: 14/186,956

(22) Filed: Feb. 21, 2014

(65) Prior Publication Data

US 2015/0237891 A1 Aug. 27, 2015

(51) Int. Cl.
*A23L 1/00* (2006.01)
*A23P 20/12* (2016.01)
(Continued)

(52) U.S. Cl.
CPC ............... *A23P 20/12* (2016.08); *A23G 3/20* (2013.01); *A23G 3/2076* (2013.01); *A23G 3/26* (2013.01);
(Continued)

(58) Field of Classification Search
CPC .......... A23G 3/26; A23G 3/20; A23G 3/2076; A23L 1/00; A23L 1/31; A61J 3/005;
(Continued)

(56) References Cited

U.S. PATENT DOCUMENTS

| 1,840,289 A | * | 1/1932 | Hunter ............ A23G 3/26 |
| | | | 118/19 |
| 2,164,044 A | | 6/1939 | Steinert |
| | | (Continued) | |

FOREIGN PATENT DOCUMENTS

| EP | 0203842 A2 | 12/1986 |
| GB | 709003 | 5/1954 |
| WO | WO 95/28088 | 10/1995 |

OTHER PUBLICATIONS

International Searching Authority (ISA); International Search Report and Written Opinion; Aug. 3, 2015.

*Primary Examiner* — Laura Edwards
(74) *Attorney, Agent, or Firm* — Patrick K. Steele; Jeffrey L. Streets

(57) ABSTRACT

An apparatus to apply seasoning to a foodstuff comprising a plurality of individual food portions comprises a rotatable drum supportable in a generally horizontal position and having an inlet at a first end, an outlet at a second end and a bore extending through the drum from the inlet to the outlet, with a substantial portion of the bore having a generally frustoconical interior with a larger diameter end of the frustoconical interior disposed proximal to the inlet and a smaller diameter end of the frustoconical interior portion disposed proximal to the outlet. In one embodiment, the frustoconical interior portion extends substantially from the inlet to the outlet and converges in that direction. In another embodiment, the generally frustoconical portion extends from a generally cylindrical interior portion, that is intermediate the inlet and the frustoconical interior portion, to the outlet and converges in that direction.

18 Claims, 8 Drawing Sheets

(51) Int. Cl.
- *A23G 3/20* (2006.01)
- *B01J 2/00* (2006.01)
- *A61J 3/00* (2006.01)
- *A23G 3/26* (2006.01)
- *A23P 20/10* (2016.01)
- *A23P 20/13* (2016.01)
- *B01F 9/00* (2006.01)
- *B05C 3/08* (2006.01)

(52) U.S. Cl.
CPC .............. *A23P 20/11* (2016.08); *A23P 20/13* (2016.08); *A61J 3/005* (2013.01); *B01J 2/006* (2013.01); *A23V 2002/00* (2013.01); *B01F 2009/0092* (2013.01); *B05C 3/08* (2013.01)

(58) Field of Classification Search
CPC .. B01J 2/006; B05C 3/08; A23P 1/082; A23P 20/12; A23P 20/13; A23P 20/11; B01F 15/00; B01F 15/0074; B01F 9/00; B01F 9/0034; B01F 2009/0092; A23V 2002/00
USPC .... 118/13, 19, 417, 418; 426/289, 292, 295; 99/494; 366/220, 225, 228
See application file for complete search history.

(56) References Cited

U.S. PATENT DOCUMENTS

| | | | | |
|---|---|---|---|---|
| 2,294,244 | A | 8/1942 | Sayre | |
| 2,625,903 | A * | 1/1953 | Opie | A23G 3/2076 118/19 |
| 3,123,498 | A * | 3/1964 | Braak et al. | A01C 1/08 118/19 |
| 4,521,116 | A | 6/1985 | Adsit | |
| 4,543,907 | A * | 10/1985 | Fowler | A21C 15/002 118/19 |
| 4,815,958 | A | 3/1989 | Buhler et al. | |
| 5,104,232 | A * | 4/1992 | Lennox, III | B01F 15/063 366/139 |
| 5,603,567 | A | 2/1997 | Peacock | |
| 5,884,999 | A | 3/1999 | Muzzio et al. | |
| 5,934,800 | A | 8/1999 | Bonacci | |
| 5,938,330 | A | 8/1999 | Robinson et al. | |
| 6,007,859 | A | 12/1999 | Taylor et al. | |
| 6,153,235 | A | 11/2000 | Krause | |
| 6,189,683 | B1 | 2/2001 | Svejkovsky et al. | |
| 6,527,104 | B2 | 3/2003 | Svejkovsky et al. | |
| 6,588,363 | B1 * | 7/2003 | Burke | A23P 1/082 118/13 |
| 6,840,664 | B2 | 1/2005 | Burke et al. | |

* cited by examiner

TUMBLE DRUM FOR FLAVORING FOOD PORTIONS

BACKGROUND

Field of the Invention

The present invention relates to an apparatus for turning, unsettling and disturbing a large plurality of individual portions of food to promote the uniform and consistent application of a granular or powderized seasoning, an oil spray and/or other flavoring material that is dispensed in a food processing system. More specifically, the present invention relates to an improved tumble drum for use in the application of seasoning, oil and/or other flavoring material to individual portions of food.

Background of the Related Art

Tumble drums are used to apply a seasoning and/or an oil spray to foodstuffs consisting of a large plurality of individual food portions such as, for example, potato chips, popcorn or nuts. These and other foodstuffs of this type are suitable for the application of seasoning and/or oil spray by continuously turning, unsettling and disturbing the individual food portions placed within the drum by rotating the drum in a generally horizontal position or in a slightly downwardly canted position.

Tumble drums are generally moved by a machine and in a manner that causes the individual food portions to progressively move through the tumble drum from the inlet to the outlet. For example, a tumble drum may be canted slightly downwardly and off horizontal to cause food portions continuously deposited into the tumble drum at the inlet to progressively move through the tumble drum at a generally controlled rate until the individual food portions reach and then spill out of the outlet. During the time that an individual food portion remains within the tumble drum, which his referred to herein as the residence time, the tumble drum rotates to continuously disturb, turn and unsettle the individual food portions. This action ensures that all sides of each individual food portion receive seasoning and/or oil spray. It will be understood that the residence time is a function of, among other factors, the downwardly cant, i.e. the angle below horizontal, of the axis about which the tumble drum rotates. A larger downwardly cant will reduce the residence time and a smaller downwardly cant will increase residence time.

A tumble drum may be rotated about a horizontal axis of rotation instead of an axis of rotation having a downwardly cant. When a tumble drum is rotated about a horizontal axis, a means other than gravity must be provided to move the individual food portions through the tumble drum. In one embodiment, the tumble drum may be coupled to a differential impulse driver that reciprocates the tumble drum along the horizontal axis of rotation while the tumble drum is rotated. The reciprocation is characterized in that the rate of acceleration of the tumble drum is less in the direction of desired movement of the individual food portions than in the opposite direction. The greater rate of acceleration in the direction opposite to the desired direction of movement of the individual food portions causes the food portions to slide along the interior wall of the tumble drum more than the food portions will slide at the lower rate of acceleration in the desired direction of movement of the food portions. The result is that the individual food portions move within the tumble drum in the direction of the smaller rate of acceleration and opposite to the direction of the greater rate of acceleration. More details relating to differential impulse conveyance are included in U.S. Pat. Nos. 6,527,104 and 6,189,683 to Svejkovsky et al.

A downwardly cant of the axis of rotation of the tumble drum, or the stroke and/or rates of acceleration imparted by a differential impulse driver, may be optimized to achieve a desired residence time of the food portions within the tumble drum. The residence time of the food portion within the tumble drum and the rate at which seasoning and/or oil spray is deposited into the tumble drum will greatly influence the amount of seasoning and/or oil spray applied to each individual food portion during its time within the tumble drum. Flights may be provided on the interior wall of the tumble drum to prevent food portions from sliding circumferentially along the interior wall of the tumble drum as it rotates. The result is that the flights turn, disturb and unsettle the food portions along the interior wall as the drum rotates, but the flights are generally disposed axially along the interior wall of the tumble drum so as not to impair the movement of food portions from the inlet to the outlet.

A problem with conventional tumble drums is revealed when the rate of throughput of the food portions varies. The residence time of a given food portion, from the time it enters the inlet of the drum to the time that it exits the outlet of the drum, will be less at a low rate of throughput than at a higher rate of throughput. This is because the higher rate of throughput causes a greater amount of stacked food portions within each axial segment along the bottom "trough" of the tumble drum, and that greater load pushes against the food portions within the trough and ahead of the stacked food portions. The result is that the "stacking" of food portions within the tumble drum creates pressure that adds to the other forces that move food portions through the tumble drum and the food portions respond by moving through the tumble drum at a faster rate than would occur if the food portions moved at a rate determined solely by the downwardly cant of the tumble drum, or by the differential impulse driver, and not by the added application of force applied by the stacking of food portions within the trough of the tumble drum.

The rate at which seasoning and/or oil spray is applied to food portions moving through a tumble drum can be varied and is generally tailored to provide a uniform and consistent amount of seasoning and/or oil on each individual portion. This requires that the seasoning and/or oil dispensing apparatus operate at a rate that is based on the residence time of the individual food portions within the tumble drum where the seasonings and/or oil are applied. Any unwanted variation in residence time resulting from variations in throughput causes food portions to be seasoned and/or oiled inconsistently, with food portions with a longer residence time in the drum (due to lower throughput) receiving more seasoning and/or oil than food portions with a shorter residence time (due to higher throughput). It is advantageous to minimize the variation in residence time of food portions that move through a tumble drum.

BRIEF SUMMARY

One embodiment of the apparatus of the present invention use in applying a flavoring material on a plurality of individual food portions, comprises a rotatable drum having an inlet at an upstream end, an outlet at a downstream end that is opposite to the upstream end, an interior wall defining an interior of the drum intermediate the inlet and the outlet, a frustoconical portion of the interior of the drum including a large diameter portion that is proximal to the inlet of the drum that tapers down to a smaller diameter portion that is proximal to the outlet of the drum, a plurality of angularly-spaced and axially-extending flights along the interior wall and within the frustoconical portion of the interior to agitate and disturb food portions received into the frustoconical portion of the drum, a drum support coupled to support the rotatable drum in one of a horizontal position, wherein the frustoconical interior portion is rotatable about a horizontal axis therethrough, and a downwardly canted position, wherein the axis of rotation of the frustoconical interior portion is downwardly canted to dispose the inlet at an elevated position relative to the outlet, a motor operatively coupled intermediate the drum support and the drum to rotate the rotatable drum about the axis of the frustoconical interior portion, and a flavoring material dispenser supported within the interior of the drum to dispense a flavoring material generally downwardly and onto food portions within the interior of the drum.

DETAILED DESCRIPTION

One embodiment of the present invention provides a tumble drum having an introduction section at the inlet, and then a generally convergent interior along substantially the length of the tumble drum. This embodiment may be useful in maintaining a generally constant and uniform residence time where the drum is rotated and canted downwardly, from the inlet to the outlet, to move food portions through the drum.

Another embodiment of the present invention provides a tumble drum having an introduction section, an intermediate section that is generally cylindrical (i.e., non-convergent), and a final convergent section that is adjacent to the outlet of the tumble drum. This embodiment has an interior circumferential ledge, or "drop-off," intermediate the intermediate, generally cylindrical section and the final, convergent section. The circumferential ledge causes food portions to drop from the middle section of the tumble drum into the convergent section. This isolates the food portions in the initial portion of the final, convergent stage from pressure or force applied by the trailing accumulation of food portions in the middle section to maintain optimal residence time. Similarly, the convergence of the interior wall of the drum in the final section retards the rate of axial movement of food portions along the tumble drum to maintain optimal residence time. This embodiment may be useful in maintaining residence time where the drum is rotated and reciprocated along its axis using a differential impulse driver to move food portions through the drum.

Figure 1:
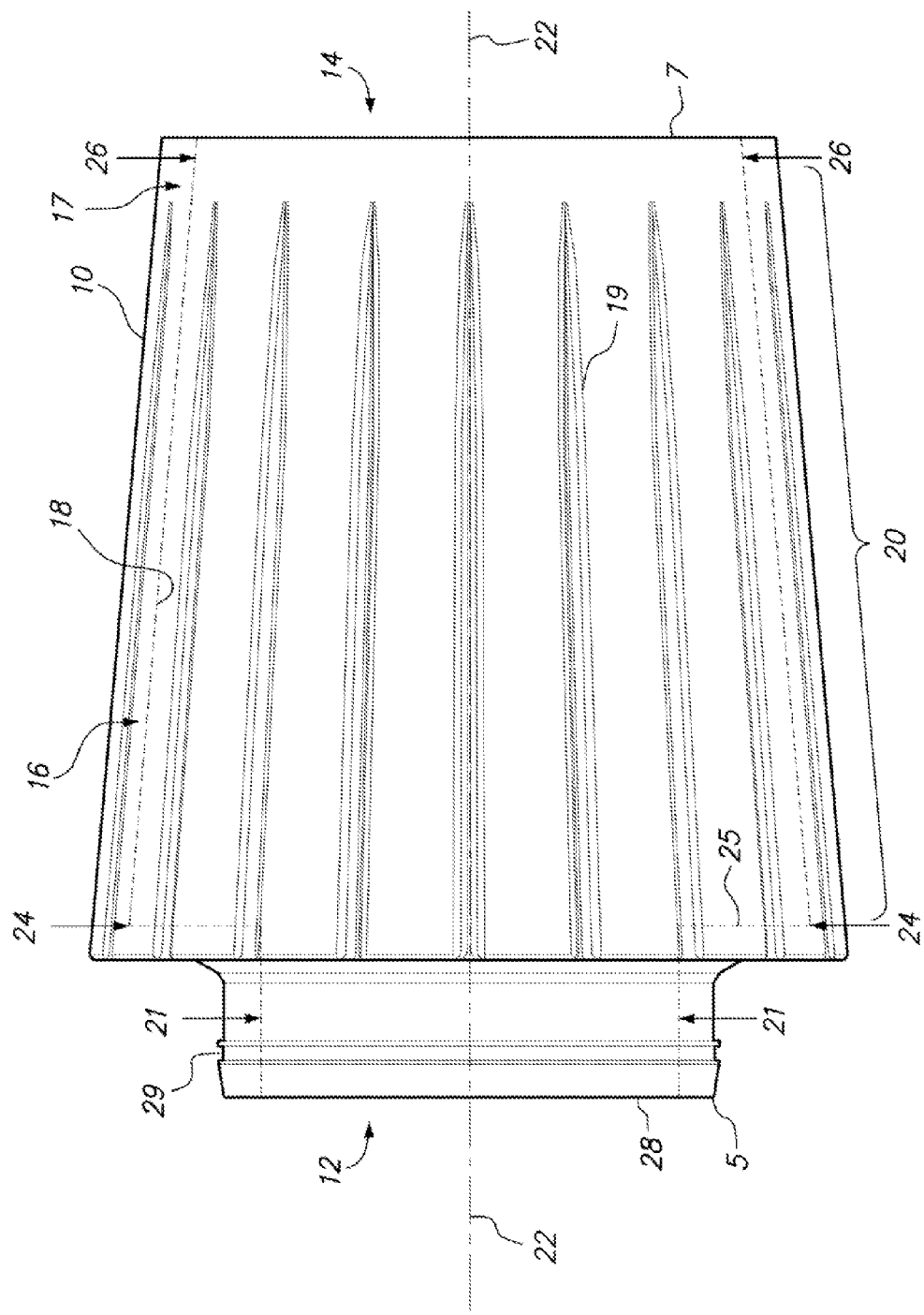
FIG. 1 is an elevation view of one embodiment of an improved tumble drum for minimizing variance in residence time of food portions moving through the tumble drum for application of seasoning or oil spray.

FIG. 1 is an elevation view of one embodiment of an improved tumble drum 10 for minimizing variance in residence time of food portions (not shown) moving through the tumble drum for application of a seasoning or an oil spray. The tumble drum 10 of FIG. 1 comprises an inlet 12 at an upstream end 5, an outlet 14 at a downstream end 7 opposite the upstream end 5, an interior wall 18, indicated by a dotted line in FIG. 1, and a portion 20 with a generally frustoconical interior. The inlet 12 to the tumble drum 10 has a diameter indicated by arrows 21. The portion 20 with the generally frustoconical interior is intermediate the outlet 14 and the inlet 12. The portion 20 with the generally frustoconical interior includes a large diameter end 16 indicated by the distance between arrows 24 proximal the inlet 12 and a small diameter end 17 indicated by the distance between arrows 26 proximal the outlet 14. A radially outward drop-off 25 is disposed intermediate the inlet 12 and the portion 20 with the frustoconical interior. The tumble drum 10 may further comprise a plurality of flutes 19 to provide rigidity to the tumble drum 10 to prevent unwanted deformation. The tumble drum 10 is rotatable about an axis 22 that generally coincides with an axis of the frustoconical interior portion 20. The tumble drum 10 may further include a protruding portion 28 about the inlet 12 having a circumferential groove 29. It will be understood that the protruding portion 28 with the groove 29 can be adapted for coupling to a motorized driver (not shown) to rotate the tumble drum 10 about the axis 22 or, alternately, for coupling to a motorized driver having a differential impulse driver to simultaneously rotate the tumble drum 10 and to reciprocate the tumble drum 10 along the axis 22.

Figure 2:
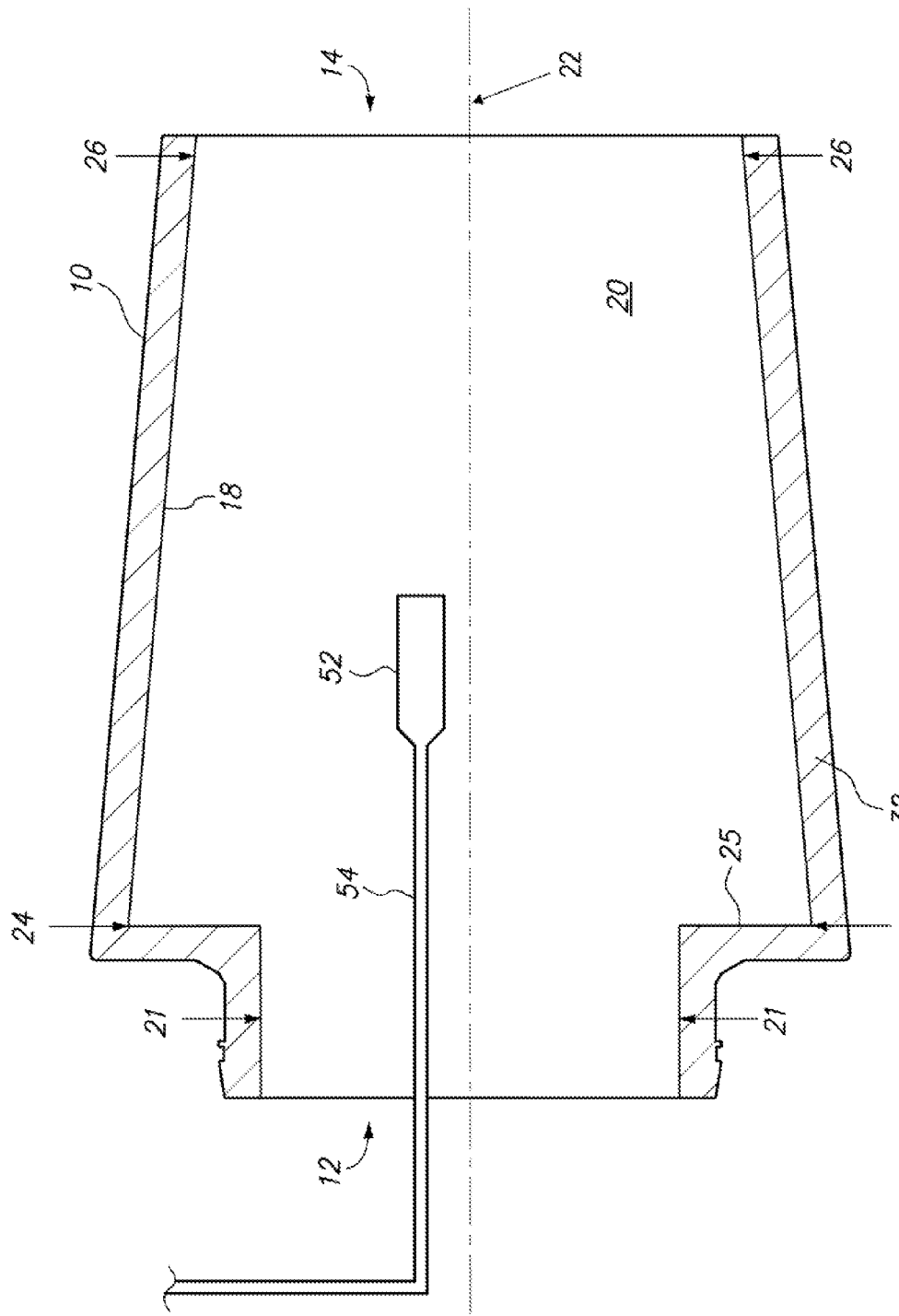
FIG. 2 is a sectional of the tumble drum of FIG. 1.

FIG. 2 is a sectional of the tumble drum of FIG. 1 that illustrates the profile of the frustoconical interior section 20 disposed intermediate the outlet 14 and the inlet 12 of the drum 10. FIG. 2 illustrates the substantial increase in diameter of the drum 10 interior from the inlet diameter indicated by arrows 21 to the large diameter end 16 of the frustoconical interior portion 20 indicated by the arrows 24, thereby forming the radial drop-off 25 over which product will spill to settle onto the interior wall 18. The frustoconical interior portion 20 illustrated in FIG. 2 performs as an accumulator by storing more volume and/or mass of the food portions for each linear unit of length of the tumble drum 10 in the axial direction, i.e. as measured along the axis 22 (see FIG. 1). The tumble drum 10 of the present invention will, at any given time and for the same rate of throughput, contain more food portions than would a conventional tumble drum. However, the food portions that are received within the tumble drum 10 of the present invention will exhibit less variation in residence time within the tumble drum 10 because the residence time of the food portions is dependent on new and controllable factors including, but not limited to, the angle of convergence of the frustoconical interior portion 20 and the length of the frustoconical interior portion 20.

Figure 3:
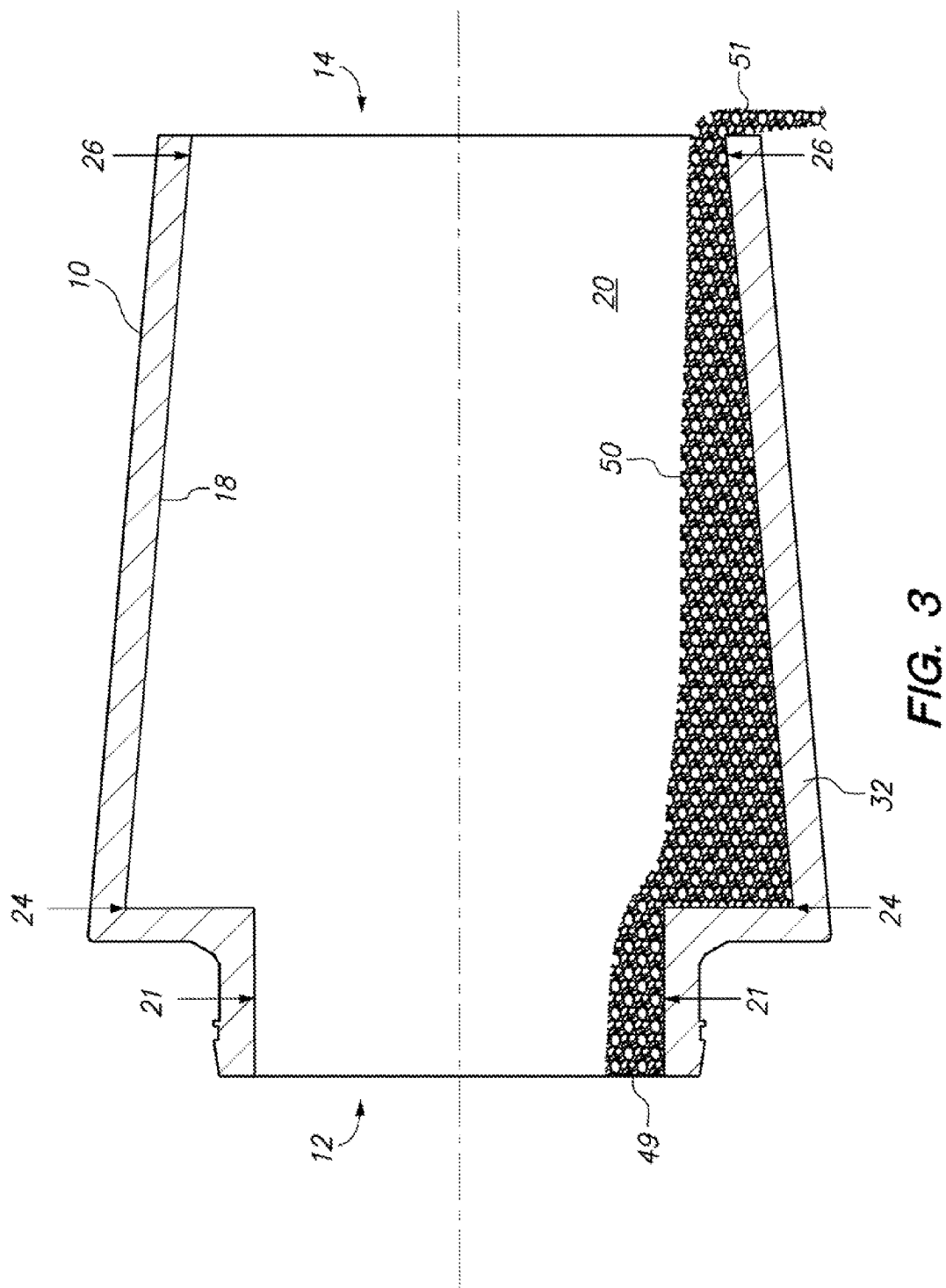
FIG. 3 is the sectional view of the tumble drum of FIG. 2 as food portions are moved through the tumble drum for application of seasoning or oil spray.

FIG. 2 illustrates the positioning of a dispenser 52 for dispensing a seasoning, such as salt, and/or an oil spray or other flavoring material onto the food portions 50 (not shown on FIG. 2—see FIG. 3). The dispenser 52 is supported within the interior of the tumble drum 10 by a tubular support arm 54 through which the flavoring material is supplied to the dispenser 52. Flavoring material (not shown) is controllably dispensed according to the rate at which food portions (not shown) moving through the tumble drum 10. The tumbling of the food portions provided by rotation of the tumble drum 10 about the axis 22 contributes to distribution and uniformity of application of the flavoring material.

FIG. 3 is the sectional view of the tumble drum 10 of FIG. 2 as food portions 50 are moved through the tumble drum 10 for application of flavoring material dispensed from the dispenser 52 (not shown in FIG. 3—see FIG. 2). The food portions 50 tend to gather and stack one upon the others in the tumble drum 10 and on the lowest portion of the interior wall 18 due to gravity. As the tumble drum 10 rotates about the axis 22, the food portions 50 are turned and unsettled, but generally remain in a stacked configuration along the bottom of the tumble drum 10 due to gravity, except where unsettled by the flights (not shown). As unseasoned and unflavored food portions 49 enter through the inlet 12 of the tumble drum 10, seasoned and flavored food portions 51 are discharged from the outlet 14 of the tumble drum 10. FIG. 3 illustrates the manner in which the tumble drum 10 having a frustoconical interior portion 20 accumulates a volume of food portions 50 for more predictable movement though the tumble drum 10 and for more consistent and less variable residence time of the food portions 50 within the tumble drum 10. This benefit enables the operator of the process to prevent over-flavoring and under-flavoring of food portions 50 due to fluctuations in residence time of food portions 50 processed using conventional tumble drums.

Figure 4:
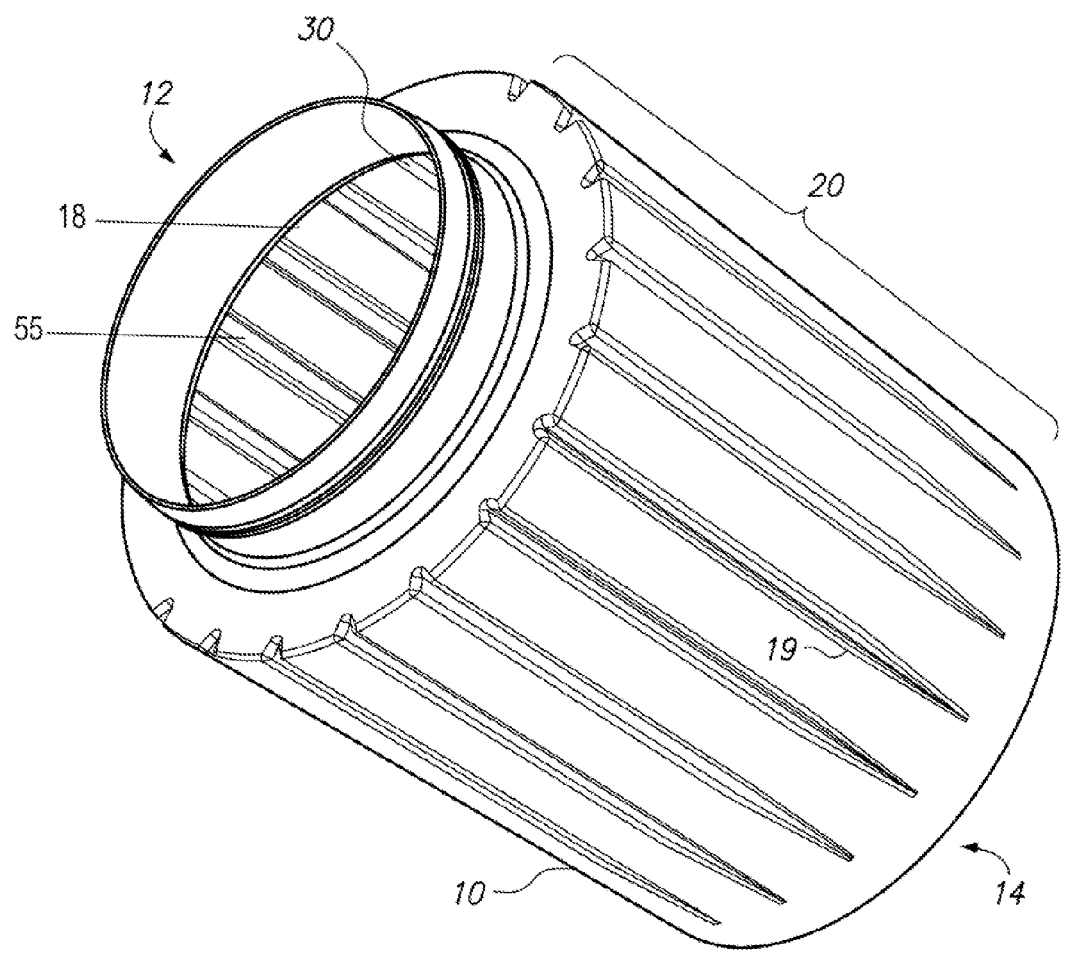
FIG. 4 is a perspective view of the improved tumble drum of FIGS. 1-3.

FIG. 4 is a perspective view of the improved tumble drum of FIGS. 1-3. FIG. 4 shows one of the flights 55 extending radially inwardly from the interior wall 18 of the frustoconical interior portion 20 of the tumble drum 10. The flights 55 are generally equally angularly spaced about the axis 22 of the tumble drum 10 and extend inwardly from the interior wall 18 towards the axis 22 (not shown in FIG. 4). The flights 55 enhance the unsettling of the food portions 50 by obstructing the food portions 50 from sliding engagement along the interior wall 18 of the tumble drum 10 and thereby carrying some of the food portions 50 through at least some angular displacement from the bottommost portion of the frustoconical interior portion 20 until the change in the angle of the flight 55 (due to rotation of the tumble drum 10) and the gravitational force on the carried food portions combine to cause the food portions to spill off of the flight 55 and back towards the bottom of the frustoconical interior portion 20.

It should be noted that, while embodiments of the improved tumble drum of the present invention can be used in a variety of processes, different embodiments may be suited for particular applications. For example, but not by way of limitation, the "full cone" or "extended cone" embodiment of FIGS. 1-4, which includes a frustoconical interior portion 20 that extends substantially from the inlet 12 to the outlet 14, is best suited for use in a process where the food portions 50 move through the tumble drum 10 due to the use of a differential impulse driver, which is discussed above. This embodiment of the tumble drum of the present invention provides a consistent rate of product flow produced by the differential impulse driver which moves food portions 50 along a circular or a frustoconically-shaped interior passage of the tumble drum by moving the circular or frustoconically-shaped interior passage in the desired direction of food portion travel at a first, low rate of acceleration to prevent or minimize the slippage or sliding of food portions 50 within the circular or frustoconically-shaped passage of the tumble drum, and then to restore the circular or frustoconically-shaped passage back to its original position using a second, greater rate of acceleration to promote or maximize the sliding of food portions 50 within the circular or frustoconically-shaped passage of the tumble drum. This cycle of movement provided by a differential impulse driver used in combination with the embodiment of the tumble drum 10 illustrated in FIGS. 1-4 serves to reduce variations in the standard deviation of residence time within the tumble drum for food portions that pass through the tumble drum, thereby providing a more consistent application of seasoning, oil spray and/or other flavoring material to each food portion that moves through the tumble drum.

An alternate embodiment of the tumble drum of the present invention includes a partially-stepped cone portion design for on-machine flavoring applications where the change in throughput and stop/start cycles occur on a frequent basis. The extended-cone embodiment of FIGS. 1-4 has the longer residence time, but the partially-stepped cone portion design provides better performance and more consistent residence time with the more frequent stops and re-starts required for tumble drums that, instead of using a differential impulse driver, rotate about a downwardly canted axis to promote movement of food portions through the rotating tumble drum. This partially-stepped cone portion design is shown in FIGS. 5-8.

Figure 5:
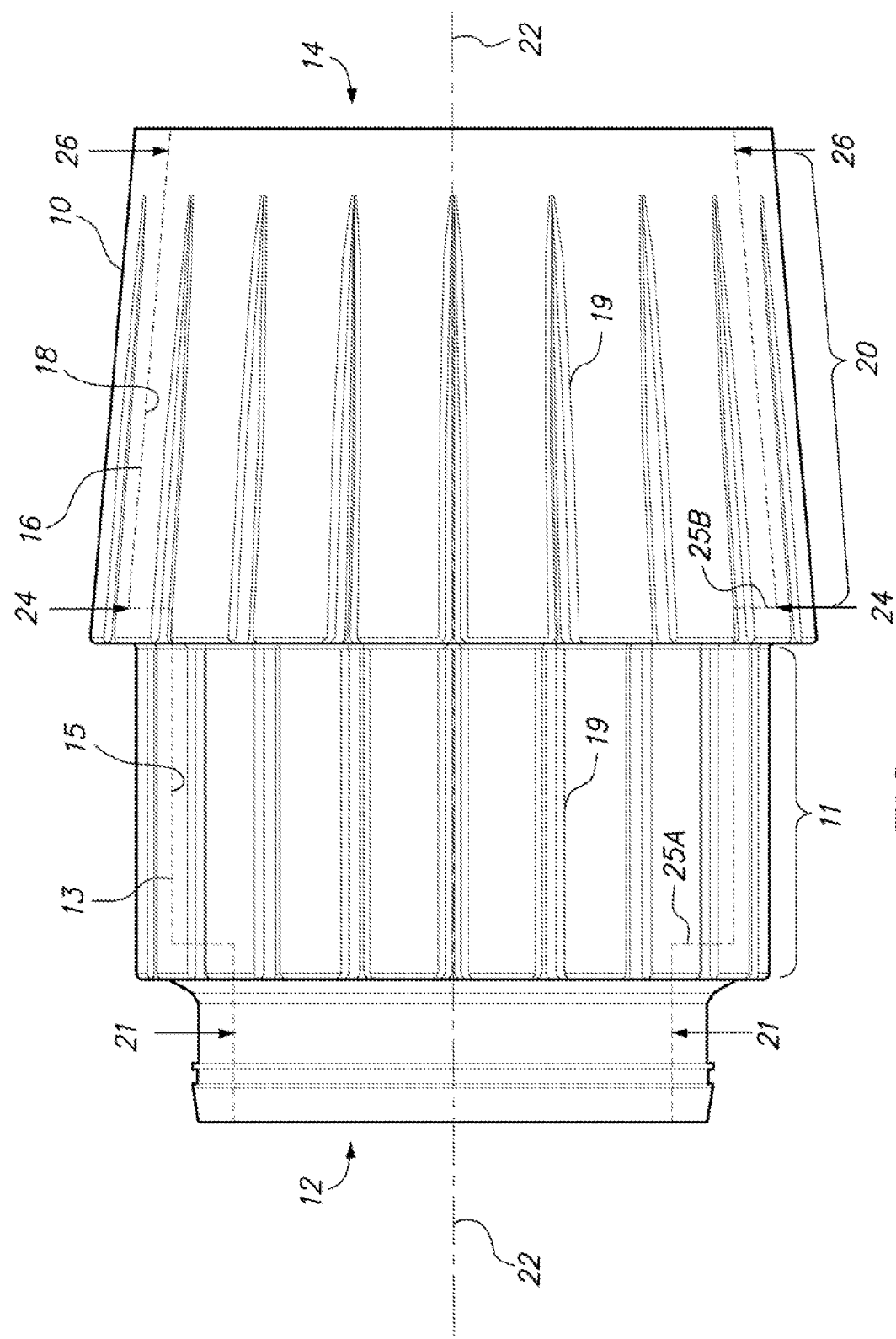
FIG. 5 is an elevation view of an alternate embodiment of an improved tumble drum for minimizing variance in residence time of food portions moving through the tumble drum for application of seasoning or oil spray.

FIG. 5 is an elevation view of the alternate embodiment of an improved tumble drum 10 having a partially-stepped cone portion for minimizing variance in residence time of food portions 50 moving through the tumble drum 10 for generally even application of a seasoning, an oil spray and/or other flavoring material. The alternate embodiment of the tumble drum 10 of FIG. 5 comprises an inlet 12, an outlet 14, a frustoconical interior portion 20, and a generally cylindrical interior portion 11 disposed intermediate the frustoconical interior portion 20 and the inlet 12. The cylindrical interior portion 11 and the adjacent frustoconical interior portion 20 are together disposed about a central axis 22 that may be downwardly canted from horizontal for movement of food portions through the drum 10. The diameter of the inlet 12 is indicated by the spacing between the arrows 21 and the cylindrical interior portion 11 is at least the same diameter or larger in diameter as the inlet 12. The diameter of the cylindrical interior portion 11 of the embodiment of the tumble drum 10 illustrated in FIG. 5 is slightly larger in diameter as the inlet 12, thereby providing a drop-off 25A intermediate the inlet 12 and the cylindrical interior portion 11. The diameter of the end of the frustoconical interior portion 20 disposed adjacent to the cylindrical interior portion 11 is indicated by the arrows 24 and is larger in diameter than the cylindrical interior portion 11, thereby providing a drop-off 25B. The diameter of the end of the frustoconical interior portion 20 adjacent to the outlet 14 is smaller in diameter than the diameter of the end of the frustoconical interior portion 20 disposed adjacent to the cylindrical interior portion 11. The tumble drum 10 of FIG. 5 further comprises a plurality of exterior flutes 19 for stiffness and strength.

Figure 6:
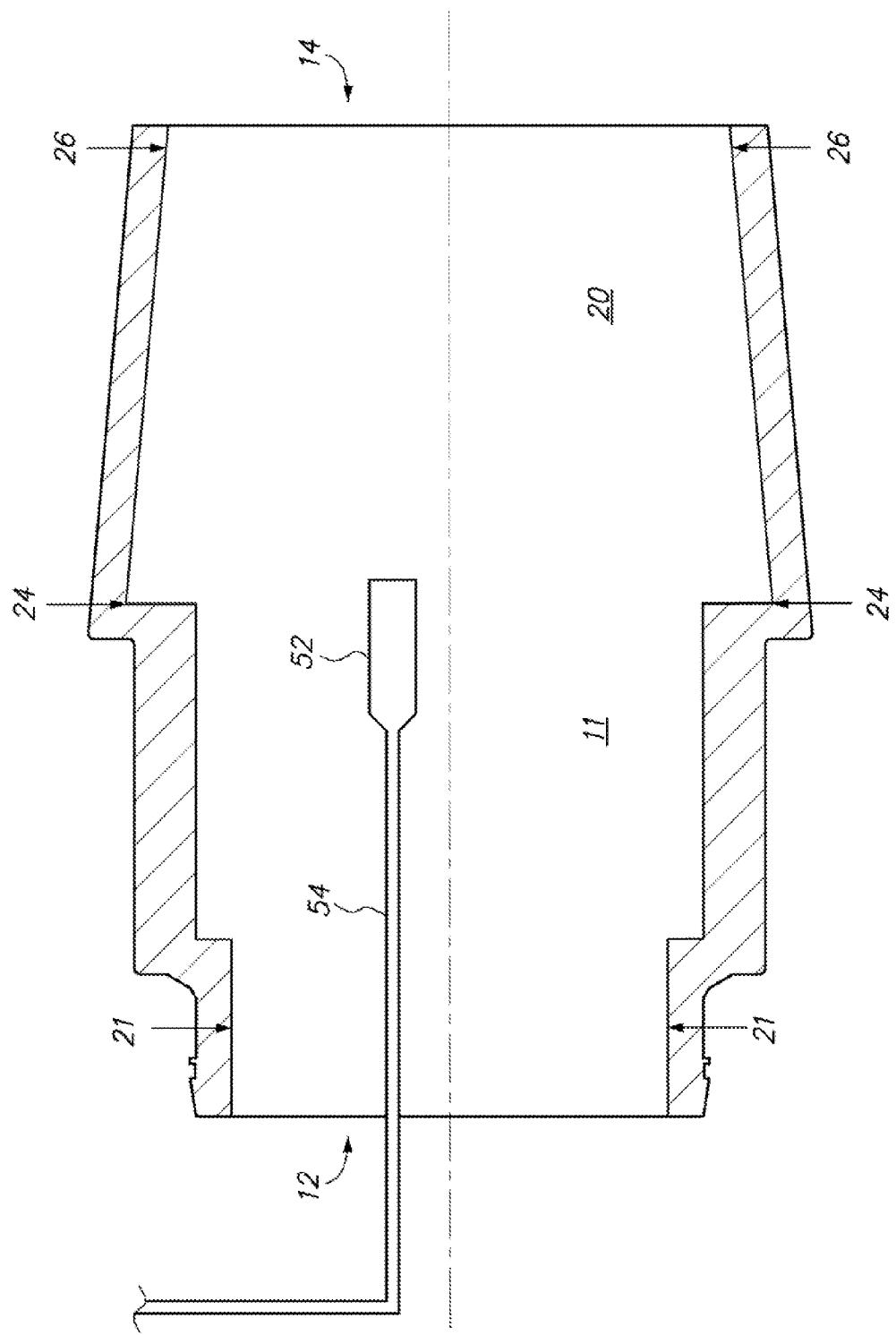
FIG. 6 is a sectional of the tumble drum of FIG. 5.

FIG. 6 is a sectional view of the tumble drum of FIG. 5 that illustrates the profile of the frustoconical interior section 20 disposed intermediate the outlet 14 and the cylindrical interior portion 11 of the tumble drum 10. FIG. 6 illustrates the substantial increase in diameter of the tumble drum 10 interior from the inlet diameter indicated by arrows 21 to the large diameter end of the frustoconical interior portion 20 indicated by arrows 24. The frustoconical interior portion 20 performs as an accumulator by storing more volume and/or mass of the food portions for each linear unit of length of the tumble drum 10 in the axial direction, i.e. as measured along the axis 22. The tumble drum 10 of the present invention will, at any given time and for the same rate of throughput, contain more food portions per inch or centimeter than would a conventional tumble drum. However, the food portions that are received within the tumble drum 10 of the present invention will exhibit less variation in residence time within the tumble drum 10 because the residence time of the food portions is dependent on new and controllable factors including, but not limited to, the angle of convergence of the frustoconical interior portion 20 and the length of the frustoconical interior portion 10.

Figure 7:
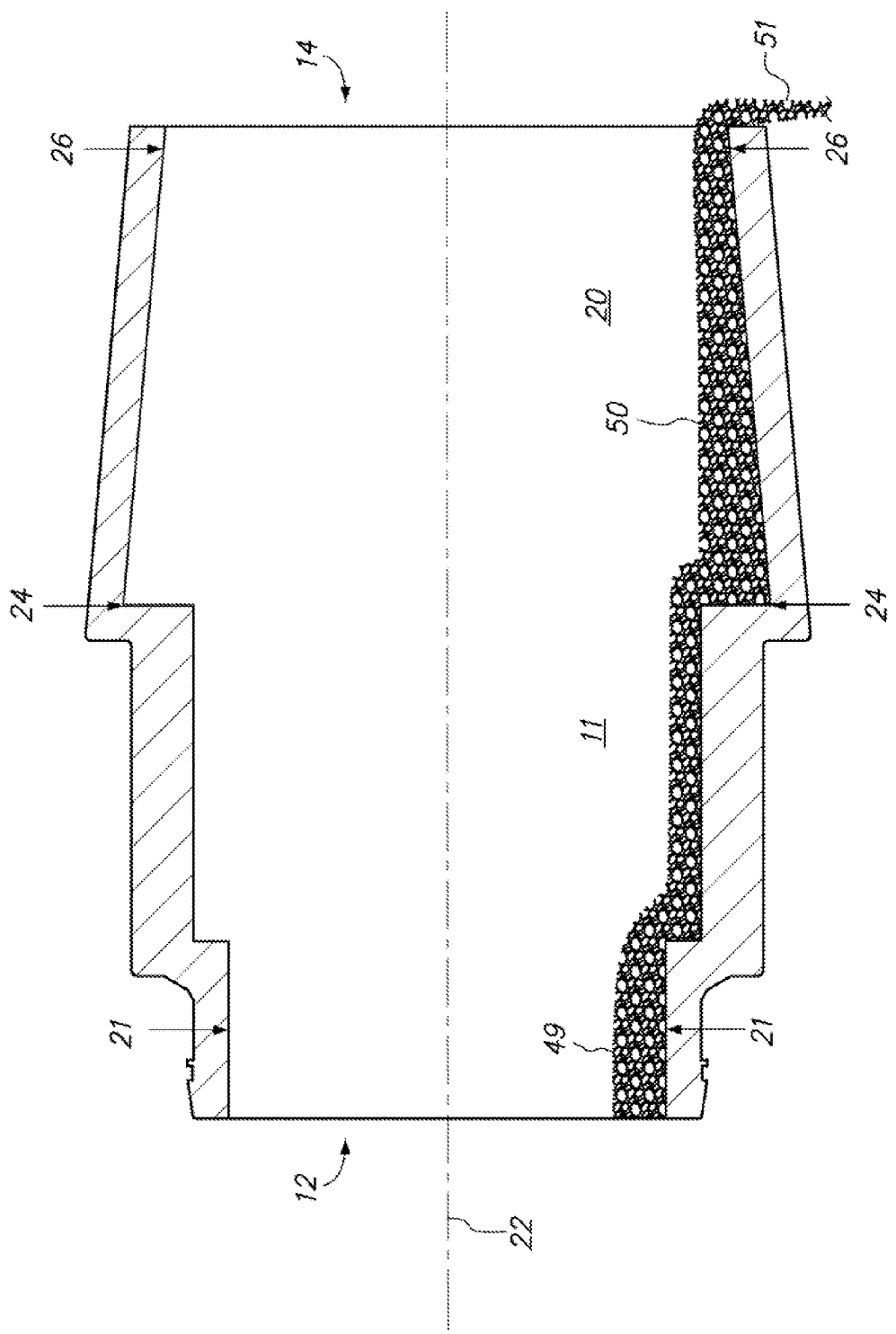
FIG. 7 is the sectional view of the tumble drum of FIG. 5 as food portions are moved through the tumble drum for application of seasoning or oil spray.

FIG. 6 illustrates the positioning of a dispenser 52 for dispensing seasoning, salt, an oil spray or other flavoring material onto the food portions 50 (not shown on FIG. 6—see FIG. 7). The dispenser 52 is supported within the interior of the tumble drum 10 by a tubular support arm 52 through which the flavoring material is supplied to the dispenser 52. Flavoring material (not shown) is controllably dispensed according to the rate at which food portions (not shown) moving through the tumble drum 10. The tumbling of the food portions provided by rotation of the tumble drum 10 about the axis 22 contributes to distribution and uniformity of application of the flavoring material.

FIG. 7 is the sectional view of the tumble drum 10 of FIG. 5 as food portions 50 are moved through the tumble drum 10 for application of seasoning, oil spray and/or other flavoring material. The food portions 50 tend to gather and stack one upon the others in the bottom of the tumble drum 10 frustoconical interior portion 20 due to gravity. As the tumble drum 10 rotates about the downwardly canted axis 22, the food portions 50 are turned and unsettled, but generally remain in a stacked configuration along the bottom of the tumble drum 10 due to gravity. As unseasoned and unflavored food portions 49 enter through the inlet 12 of the tumble drum 10, seasoned and flavored food portions 51 are discharged from the end of the tumble drum 10. FIG. 7 illustrates the manner in which the tumble drum 10 having a frustoconical interior portion 20 accumulates a volume of food portions 50 for more predictable movement though the tumble drum 10 and for more consistent residence time within the tumble drum 10. This benefit enables the operator of the process to prevent over-flavoring and under-flavoring of food portions 50 due to fluctuations in residence time of food portions 50 processed using conventional tumble drums.

Figure 8:
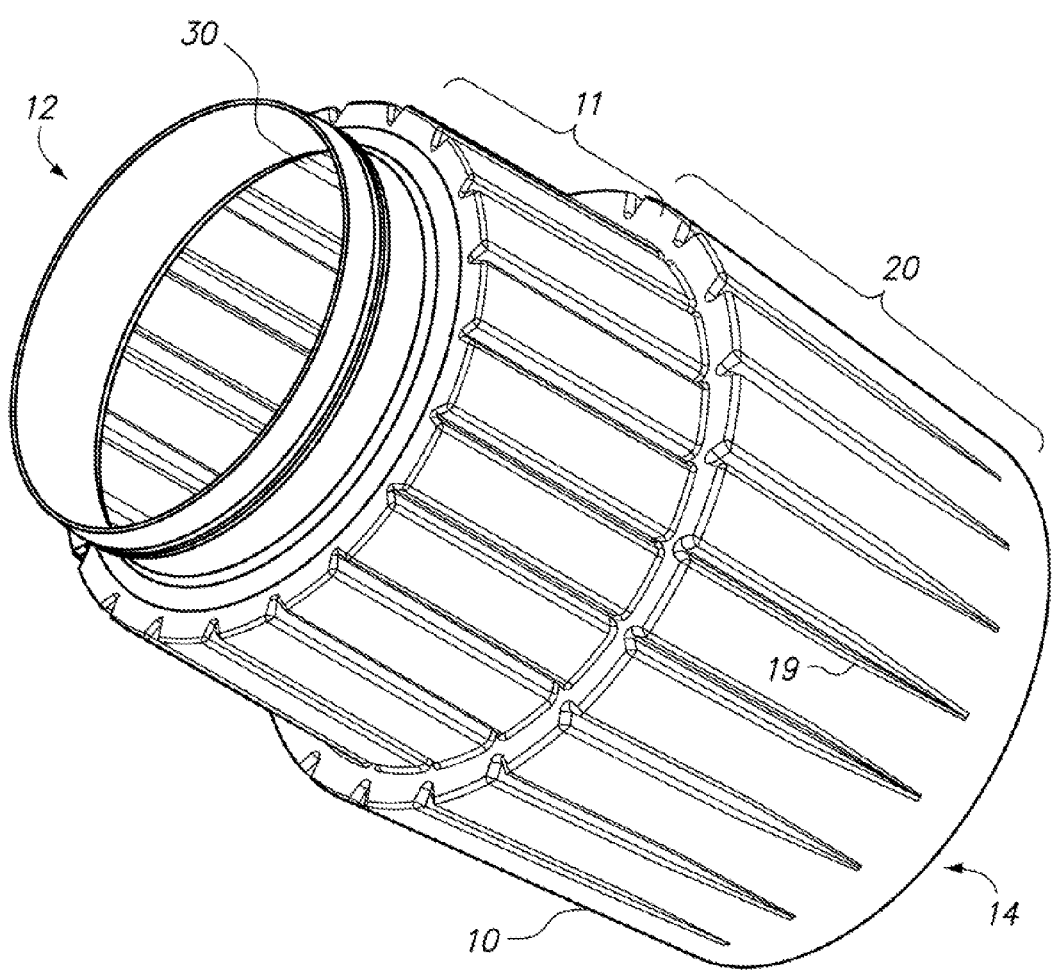
FIG. 8 is a perspective view of the improved tumble drum of FIGS. 5-7.

FIG. 8 is a perspective view of the improved tumble drum 10 of FIGS. 5-7. Radially inwardly-extending flights 30 are angularly spaced about the interior of the generally cylindrical interior portion 11 and extend through the frustoconical interior portion 20.

It will be understood that the relative length of the generally cylindrical interior portion 11 and the frustoconical interior portion 20 may vary according to the diameters indicated by the arrows 21, 24 and 26 shown in FIGS. 5 and 6. Other factors, including, but not limited to, the size and stacking characteristics of the food portions 50, the downwardly canted angle (when present) and the angle of convergence of the frustoconical interior section 20 influence the residence time of the food portions 50 within the tumble drum 10.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for use in the application of a flavoring material on a plurality of individual food portions, comprising:
    a rotatable drum having:
        an inlet at an upstream end;
        an outlet at a downstream end that is opposite to the upstream end;
        an interior wall defining an interior of the drum intermediate the inlet and the outlet;
        a frustoconical portion of the interior of the drum including a large diameter portion that is proximal to the inlet and a smaller diameter portion that is proximal to the outlet;
        a radially outward drop-off in the interior wall of the drum and intermediate the larger diameter portion of the frustoconical portion of the interior of the drum and the inlet;
        a plurality of angularly-spaced and axially-extending flights on the interior wall and within the frustoconical portion of the interior to agitate and disturb food portions received into the frustoconical portion of the drum;
    a drum support coupled to support the rotatable drum in one of a horizontal position, wherein the frustoconical interior portion is rotatable about a horizontal axis therethrough, and a downwardly canted position, wherein the axis of rotation of the frustoconical interior portion is downwardly canted to dispose the inlet at an elevated position relative to the outlet;
    a motor operatively coupled intermediate the drum support and the drum to rotate the rotatable drum about the axis of the frustoconical interior portion; and
    a seasoning dispenser supported within the interior of the drum to dispense a seasoning material generally downwardly and onto food portions deposited through the inlet.

2. The apparatus of claim 1, wherein the seasoning material dispensed generally downwardly onto the food portions is one of a powder and granules.

3. The apparatus of claim 1, wherein the motor is electrically-powered.

4. The apparatus of claim 3, further comprising:
a gear reducer disposed intermediate an output shaft of the motor and the drum.

5. The apparatus of claim 1, wherein the axis of rotation of the drum is canted downwardly and within the range from 1 degree from horizontal to 30 degrees from horizontal.

6. The apparatus of claim 5, wherein the axis of rotation of the drum is canted downwardly and within the range from 5 degrees to 15 degrees from horizontal.

7. The apparatus of claim 1, wherein the seasoning dispenser is supported by an arm extending through the inlet of the rotatable drum.

8. The apparatus of claim 1, wherein the ratio of the diameter of the larger diameter portion of the frustoconical interior, that is adjacent to the first end of the drum, is within the range from 1.1 to 1.6 times the size of the smaller diameter portion of the frustoconical interior, that is adjacent to the second end of the drum.

9. The apparatus of claim 7, wherein an axial length of the interior of the drum from the inlet to the outlet is greater than the large diameter portion of the frustoconical portion of the drum.

10. An apparatus for use in the application of a seasoning material onto a foodstuff consisting of a large plurality of individual food portions, comprising:
a rotatable drum having an inlet at a first end, an outlet at a second end that is opposite to the first end, a first interior portion having a generally cylindrical interior with a first diameter, a second interior portion having a frustoconical interior therebetween with a larger diameter portion that is larger than the first diameter of the first interior portion disposed adjacent to the first end of the drum and a smaller diameter portion disposed adjacent to the second end of the drum, a radially outward drop-off in an interior wall of the drum and intermediate the larger diameter portion of the frustoconical portion of the interior of the drum and the inlet and a plurality of angularly-spaced flights disposed on the interior wall of the drum, each extending generally along an axial length of the frustoconical interior, to agitate and disturb food portions deposited within the interior of the rotatable drum for seasoning;
a drum support coupled to support the rotatable drum with the inlet elevated relative to the outlet to provide gravity-assisted sliding of food portions within the interior of the rotatable drum and in a direction from the inlet to the outlet;
a motor operatively coupled to rotate the rotatable drum about an axis of the frustoconical interior to thereby unsettle and disturb food portions deposited through the inlet and within the interior of the drum;
a differential impulse driver operatively coupled to reciprocate the rotatable drum along an axis of the frustoconical interior to thereby move food portions deposited through the inlet and within the interior of the drum in a direction from the inlet to the outlet; and
a seasoning dispenser supported within the frustoconical interior of the drum to dispense a seasoning material generally downwardly and onto food portions deposited through the inlet.

11. The apparatus of claim 10, wherein the seasoning material dispensed generally downwardly onto the food portions is one of a powder and granules.

12. The apparatus of claim 10, wherein the motor is electrically-powered.

13. The apparatus of claim 12, further comprising:
a gear reducer disposed intermediate an output shaft of the motor and the drum.

14. The apparatus of claim 10, wherein the axis of rotation of the drum is within the range from 1 degree from horizontal to 30 degrees from horizontal.

15. The apparatus of claim 10, wherein the seasoning dispenser is supported by an arm extending through the inlet of the rotatable drum.

16. The apparatus of claim 10, wherein the ratio of the diameter of the larger diameter portion of the frustoconical interior, that is adjacent to the first end of the drum, is within the range from 1.1 to 1.6 times the size of the smaller diameter portion of the frustoconical interior, that is adjacent to the second end of the drum.

17. The apparatus of claim 16, wherein an axial length of the interior of the drum from the inlet to the outlet is greater than the diameter of the larger diameter end of the frustoconical portion of the drum.

18. The apparatus of claim 10, wherein the differential impulse driver is configured to cyclically move the rotatable drum a distance, generally along its axis and in a direction from the outlet to the inlet, at a first rate of acceleration and then moves the rotatable drum the distance, generally along its axis and in a direction from the inlet to the outlet, at a second rate of acceleration that is less than the first rate of acceleration;
wherein food portions deposited into the interior of the drum slide along the wall of the interior of the drum due to a lack of sufficient friction between the food portions and the wall to enable movement of the food portions with the wall at the first rate of acceleration; and
wherein food portions deposited into the interior of the drum move with the wall of the interior of the drum due to sufficient friction between the food portions and the wall to enable the movement of the food portions with the wall at the second rate of acceleration.

* * * * *